US005608929A

United States Patent [19]

Crane

[11] Patent Number: 5,608,929

[45] Date of Patent: Mar. 11, 1997

[54] PATIENT-POSITIONING DEVICE

[76] Inventor: Lawrence Crane, 299 Presumpscot St., Portland, Me. 04103

[21] Appl. No.: 584,406

[22] Filed: Jan. 11, 1996

[51] Int. Cl.[6] .............................. A61C 7/10

[52] U.S. Cl. .................... 5/81.1 R; 5/81.1 HS; 5/81.1 T

[58] Field of Search .............................. 5/612, 81.1 R, 5/81.1 C, 81.1 T, 81.1 HS, 88.1, 89.1

[56] References Cited

U.S. PATENT DOCUMENTS

| | | | |
|---|---|---|---|
| 1,085,879 | 2/1914 | Skeffington | 5/88.1 |
| 2,827,642 | 3/1958 | Huff | 5/88.1 |
| 3,108,290 | 10/1963 | Partridge | 5/88.1 |
| 3,383,717 | 7/1968 | Underwood | 5/612 |
| 3,562,824 | 2/1971 | White | 5/612 |
| 3,829,914 | 8/1974 | Treat | 5/81.1 T |
| 5,280,657 | 1/1994 | Stagg . | |

*Primary Examiner*—Michael F. Trettel

*Attorney, Agent, or Firm*—Chris A. Caseiro; Thomas L. Bohan

[57] ABSTRACT

A positioning device for people in hospital beds is disclosed. The device includes a sheet which is placed under the patient. This is connected by rope to an apparatus on the headboard of the bed. Either by the bed's existing motor, or an independent motor, the patient is moved up in bed towards the headboard. This action eliminates the need for two or more people for the job of positioning a person in bed. The chance of an on-the-job injury is also greatly reduced with this positioning aid.

14 Claims, 6 Drawing Sheets

PATIENT-POSITIONING DEVICE

BACKGROUND OF THE INVENTION

1. Technical Field

The present invention relates to devices for easily moving a patient from one location in a bed to another location in that bed. More particularly, the present invention relates to patient-positioning devices designed to move the patient toward the head of the bed after having slid down toward the foot of the bed when the head of the bed has been elevated. Still more particularly, the present invention relates to a patient-position device that can be operated by a single individual.

2. Description of the Prior Art

Since the introduction of beds which elevate the head, patients have had to be repositioned. A person in a hospital or nursing home often does not have the ability to lift or position themselves in the correct position for sleeping. In order to eat or read or watch television or sit up, a patient elevates the head of a standard type hospital bed. This elevation causes the person to slide down towards the foot of the bed. When the head of the bed is lowered to a flat position, the person is too low in the bed. That is, the person's head is not located near the head of the bed but is rather located somewhere between the head and the middle of the bed. The person is, in effect, placed in an uncomfortable position. For an injured or ill person, this poor positioning in bed generally results in an exacerbation, if only temporarily, of the underlying physical condition.

In order to alleviate this problem, the patient is generally re-positioned in the bed. The method currently used is for two or more of the nursing staff to come into the room and manually slide the patient up to the correct position. This is accomplished by holding the draw sheet and sliding the person up. The draw sheet is an extra sheet that is smaller and stronger than an average bed sheet. It fits under the heaviest part of a person and its sole purpose is positioning patients in bed. This method is time consuming in that it requires two members of the hospital staff to coordinate their efforts, and reduces the amount of time available to care for other patients. Naturally, this is compounded by the total number of patients requiring such re-positioning. This method is less than ideal for the patient because that patient may have to wait for a considerable period of time before the two hospital staff members are available to perform the task.

While the patient may be comforted through this two-person technique, it is often the case that one staff member will attempt the re-positioning, if only because of the difficulty in getting two caregivers in one location at the same time. In that situation it is not uncommon for the one person to over extend and cause a back injury to himself or herself. This problem has been observed in hospitals throughout the country. This leads to a loss of healthcare personnel availability and can be expensive for the employer-hospital. Of course, even with two people performing the re-positioning task, back injuries can still occur.

One attempt to solve this problem is a device described in U.S. Pat. No. 5,280,657 issued to Stagg. Stagg describes a device designed to assist a caregiver in re-positioning a patient in bed. The device includes strapping that is attached to a fabric panel located between the patient and the bed-sheet. The strapping is adjustable and it wraps around the mattress and is affixed to the movable bed support. When the bed is moved, the strapping is apparently designed to pull the fabric panel, and thus the patient, up toward the head of the bed.

There are several notable problems regarding the Stagg design. These problems are associated with the use and location of the adjustable strapping. Stagg indicates that the strapping may be adjusted so that the full use of the mattress length may be realized. This is apparently intended to accommodate patients of different sizes and patients who start out in different positions on the bed prior to re-positioning. The problem with this adjustability is that it requires additional effort from the caregiver. Further, the strapping is two different pieces that must be adjusted in unison in order to insure that the patient will be drawn upward uniformly. That may be a difficult proposition in every instance. A secondary problem related to the Stagg strapping is the location of the strapping. It is designed to be placed over the mattress head and affixed to the bedframe below. As the bed moves, the strapping moves with it, and the fabric panel is supposed to move with that. Unfortunately, there is some initial give in the mattress so that the mattress will first be squeezed by the strapping before the fabric panel actually moves. This will reduce the total distance available for re-positioning the patient. While Stagg indicates that a rigid component may be added to the system to reduce this effect, that is one additional component to apply, one that may easily be removed or forgotten by a harried caregiver.

In addition, by wrapping the strapping directly around the mattress, Stagg limits the total positioning distance available. The fulcrum for movement is the edge of the mattress head. It would be much more effective to provide the fulcrum beyond that point so as to increase the available distance to move the patient and to optimize the force applied by the movement of the bed. A final and distinct problem with the Stagg device is the apparent lack of safety means for insuring that the device will be incapacitated in the event the caregiver leaves the patient without disabling the device.

Therefore, what is needed is a patient re-positioning device that may be operated by a single individual and that is designed to take advantage of the maximum possible distance available to re-position the patient within the confines of the existing bed design. What is also needed is a patient re-positioning device that is easy to operate and that includes a safety feature to halt operation of the device when desired.

SUMMARY

It is an object of the present invention to provide a patient re-positioning device that may be operated by a single individual and that is designed to take advantage of the maximum possible distance available to re-position the patient within the confines of the existing bed design. It is also an object of the present invention to provide such a patient re-positioning device that is easy to operate and that includes a safety feature to halt operation of the device when desired.

These objectives are achieved in the present invention through the combination of a unique intermediary sheet and the coupling of that sheet with the movement mechanism of a standard-type hospital bed. This device starts with a balloon-shaped sheet that has a loop at the head end to facilitate the connection of a rope or cable. This rope or cable attaches to the sheet and then goes to a sequence of pulleys attached to the head board of the bed. From the headboard, the line goes through another pulley attached to the frame of the bed adjacent to the floor. From this frame pulley, the line travels back to the head board assembly to an adjustable jam cleat.

To operate the device, one simply attaches the rope to the sheet, pulls the rope tight in the jam cleat, then elevates the bed by touching the up button pulling the patient up in bed. The patient slides up in bed a distance that may be as great as the distance between the bed frame and the bottom of the bed mattress. For many hospital beds, that is on the order of about 16 inches. As an additional benefit, the line which attaches to the bed sheet can also be a pulley with a hook. Three pegs on the top of the head board assembly position the patient to the right, left, or center. An additional cleat may be attached either on the left or right side of the head board to secure the rope or cable in position if desired.

By incorporating the head board assembly into the device, the problems which do not allow the Stagg device to operate effectively are solved. The headboard assembly acts as the fulcrum to avoid mattress slippage and collapse. The loop in the rope that attaches to the pegs on the headboard provide a safety release if the nurse should forget to detach the device. Also, the pulleys on the head board assembly are designed for the working load and can withstand the forces inherent with this device. Finally, the positioning aid currently presented uses the lifting forces of the straight elevation of the bed. This covers a complete span of sixteen inches for most hospital beds, as earlier noted. This is usually more than enough to position the patient in the proper spot on the bed.

These and other advantages of the present invention will become apparent upon review of the following drawings, the detailed description of the invention, and the appended claims.

DETAILED DESCRIPTION OF THE PREFERRED EMBODIMENT OF THE INVENTION

Figure 1:
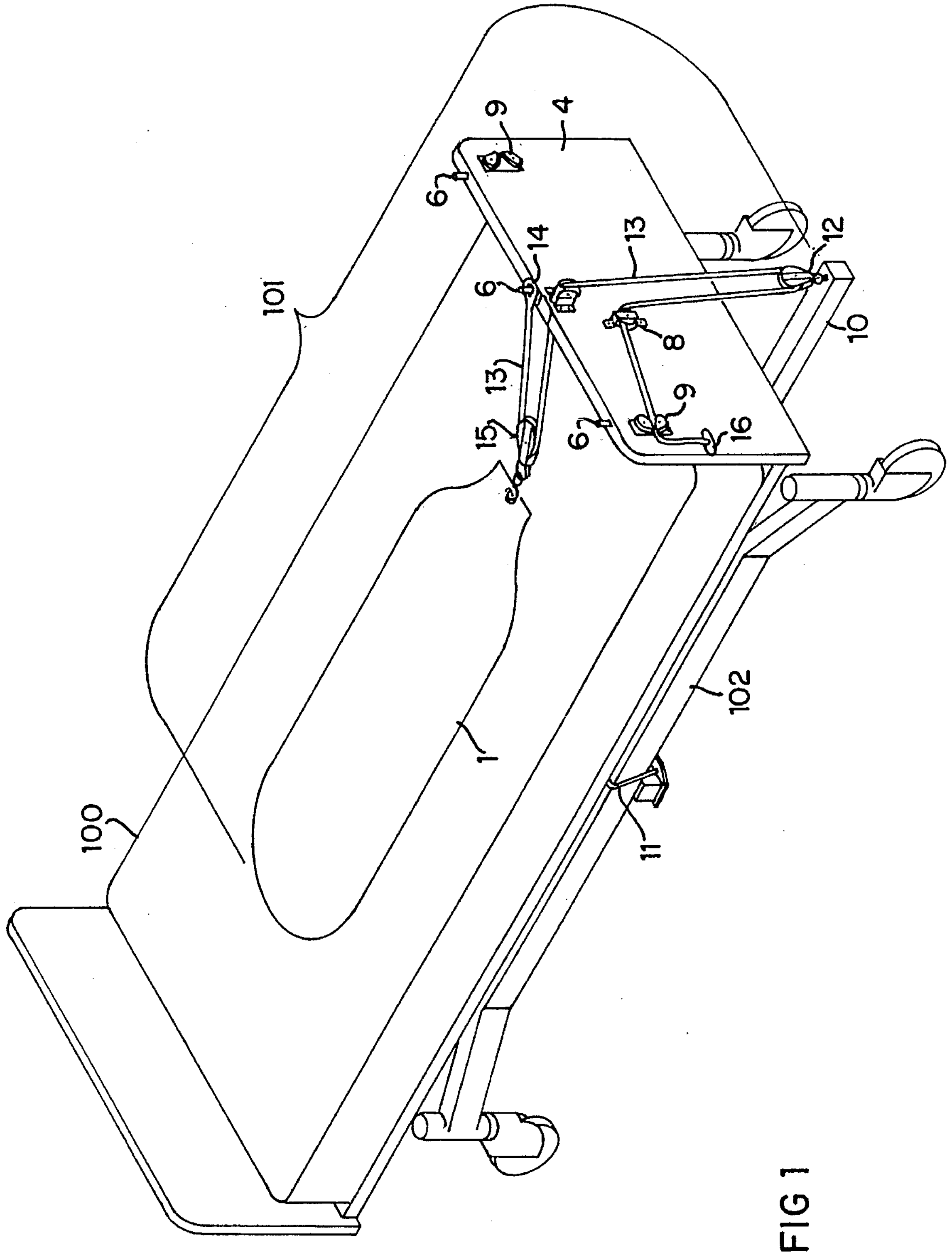
FIG. 1 is a perspective view of the re-positioning device of the present invention.
Figure 2:
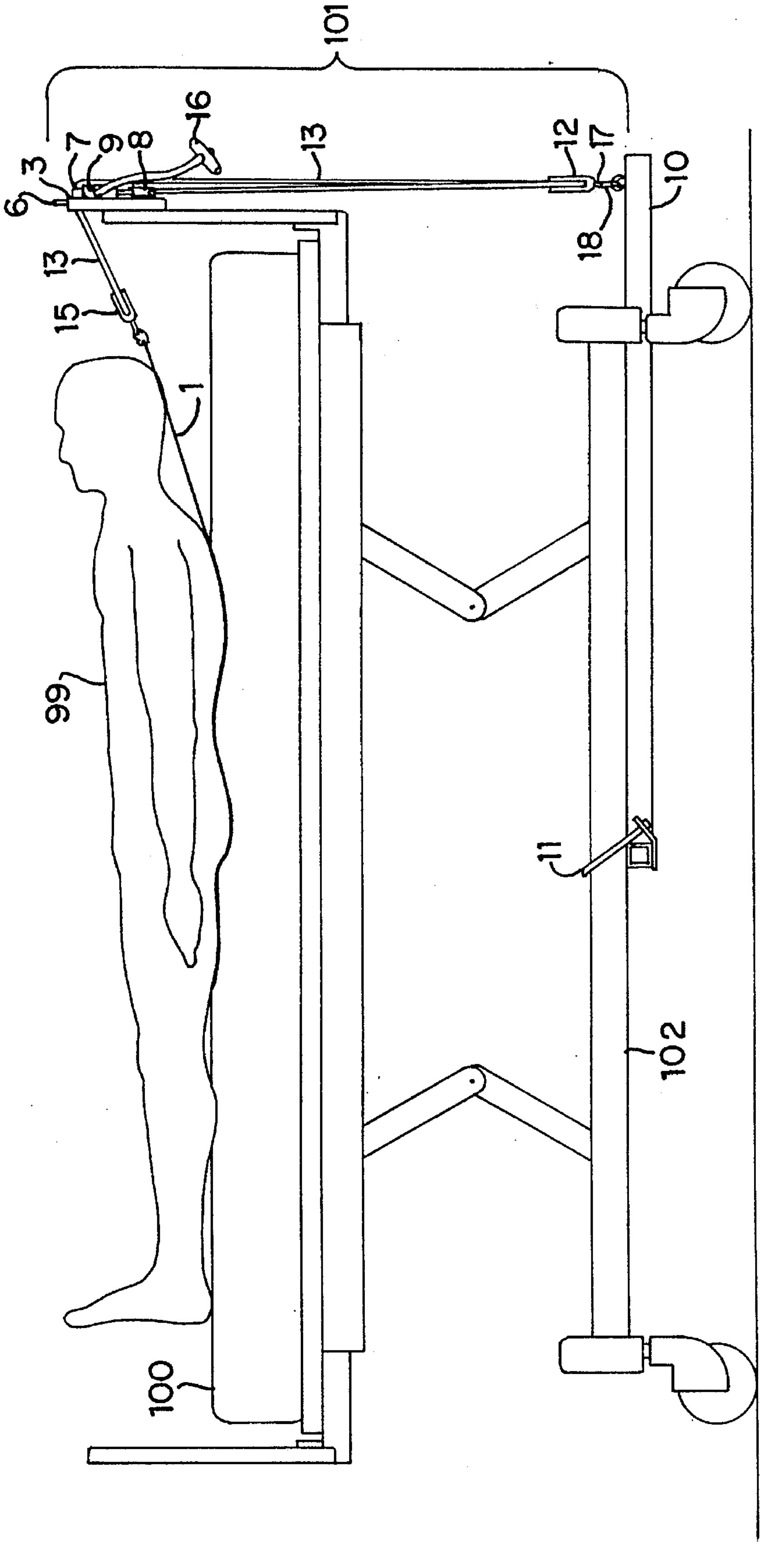
FIG. 2 is a side view of the re-positioning device of the present invention, showing a patient positioned on the intermediary sheet.

The movement of sliding a patient 99 up in a bed 100 can be accomplished much easier with the currently devised patient-positioning device 101 shown in FIGS. 1–7. As shown in FIGS. 1 and 2, the device 101 includes an intermediary sheet 1, that may be described as a draw sheet. It is to be understood that the sheet 2 may be of any suitable shape, including but not limited to, the balloon design shown, provided the patient 99 is adequately supported thereon. A head board assembly 3 attaches to a bed head board 4 and is designed to couple the sheet 2 to an underlying frame assembly 11 that joins the device 101 to the bed 100 at a standard bed frame 102. A non-rigid attachment means, such as a rope or cable 13 joins the sheet 2, the head board assembly 3, and the frame assembly 11 together by means of a series of pulleys designed to reduce the force required to move the patient 99. For a standard hospital bed, a 16-inch throw is available and obtained through use of the present invention simply by elevating the bed 100 using a position-control device standard on such beds.

Component Description

1) The Draw Sheet 1

The draw sheet 1 is a round or balloon shaped sheet with a loop 2 on the top end. The sheet 1 may be one layer, two layers, or three layers measuring approximately 32 inches in length. If three layers are used the top layer is made of normal bed sheeting. The bottom layer is made of a slippery yet strong Olympic cloth. The optional middle layer is made of Hospital Sheeting. This is an absorbent material for incontinent patients. This sheet 1 is placed under the patient's rear and remains there. It may be repositioned as necessary.

2) The Headboard Assembly 3

Figure 3:
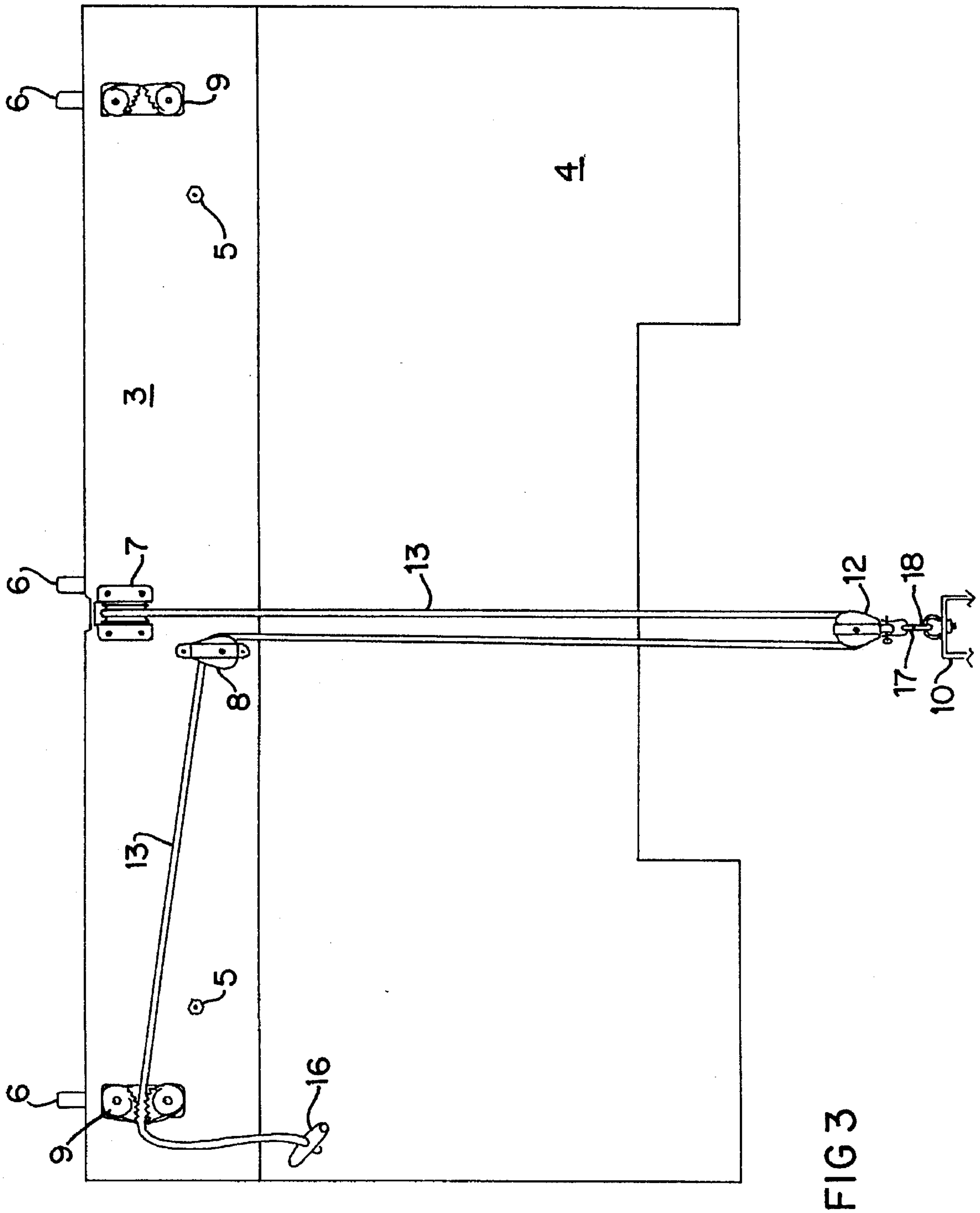
FIG. 3 is a front view of the modification to the head board of the bed, showing several components on the head board assembly of the present invention.

The head board assembly 3 shown in FIG. 3 is a stand-alone board that may be fabricated of wood or any suitable material, and that connects to the head board 4 of the standard hospital bed 100. This head board assembly 3 is approximately 36 inches in length and 8 inches in height. The head board assembly 3 attaches to the head board 4 through the use of any of a variety of attachment means, including a vise arrangement on either end (not shown) or it may be held by two bolts 5.

The main purpose of the head board assembly 3 is to act as a mounting area for the pulleys that make the positioning device 101 operate effectively. Preferably, the head board assembly 3 includes three metal pegs 6 on the top. One in the center, one on the left, and one on the right. Notched in the center of the board, a single upright lead block and pulley arrangement 7 is fastened. Affixed below this pulley arrangement 7 is an optional wire cheek block 8 that may be used to divert the rope or cable 13 to another location for the purpose of insuring that the sheet 1 will move only when desired.

3) The Frame Assembly 10

Figure 4A:
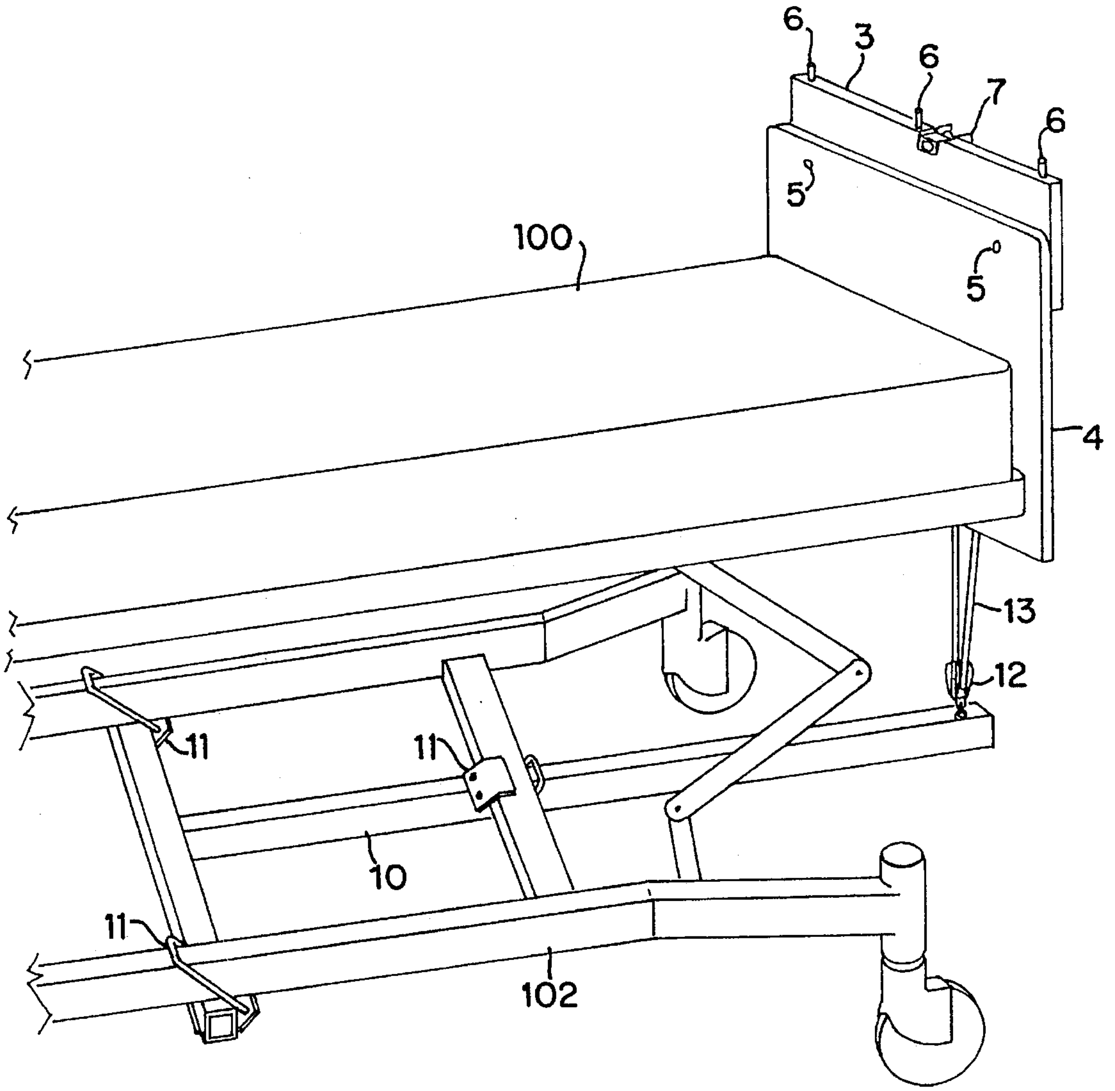
FIG. 4A is a side view of a portion of the present invention, showing details of the attachment to the bed frame.
Figure 4B:
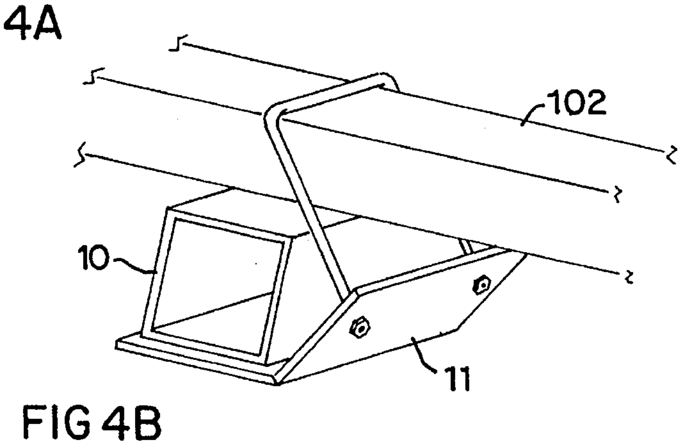
FIG. 4B is a perspective view of the adjustable clamps of the present invention used to connect the re-positioning device to the bed frame.

In the preferred embodiment of the present invention the frame assembly 10 shown in FIG. 4A is a channeled piece of steel in the form of a "T". It measures approximately 4 ft. long by 18 inches at the top. It attaches to the bed frame 102 by means of adjustable U-clamps 11 shown in FIG. 4B. At the end of the frame assembly 10, a single bullet block 12 is attached. This is the lower fulcrum that allows the elevation of the bed 100 to pull the patient 99 up in the bed 100. The frame assembly 10 is designed to operate in conjunction with either the bed motor available on standard hospital beds, or, with an independent motor to move the bed 100 upward and downward.

4) Connecting Rope or Cable 13

Figure 5:
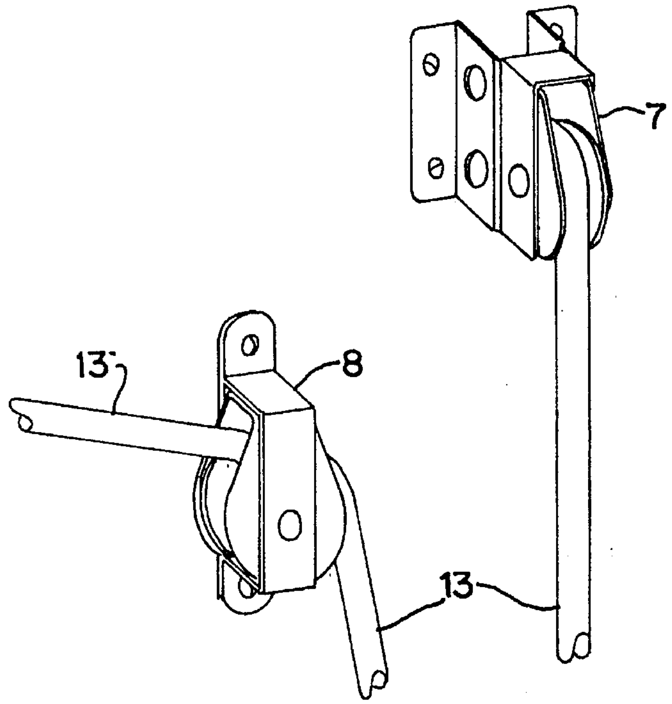
FIG. 5 is a close-up view of the blocking arrangement coupling the attachment rope or cable to the center pulley assembly.
Figure 6:
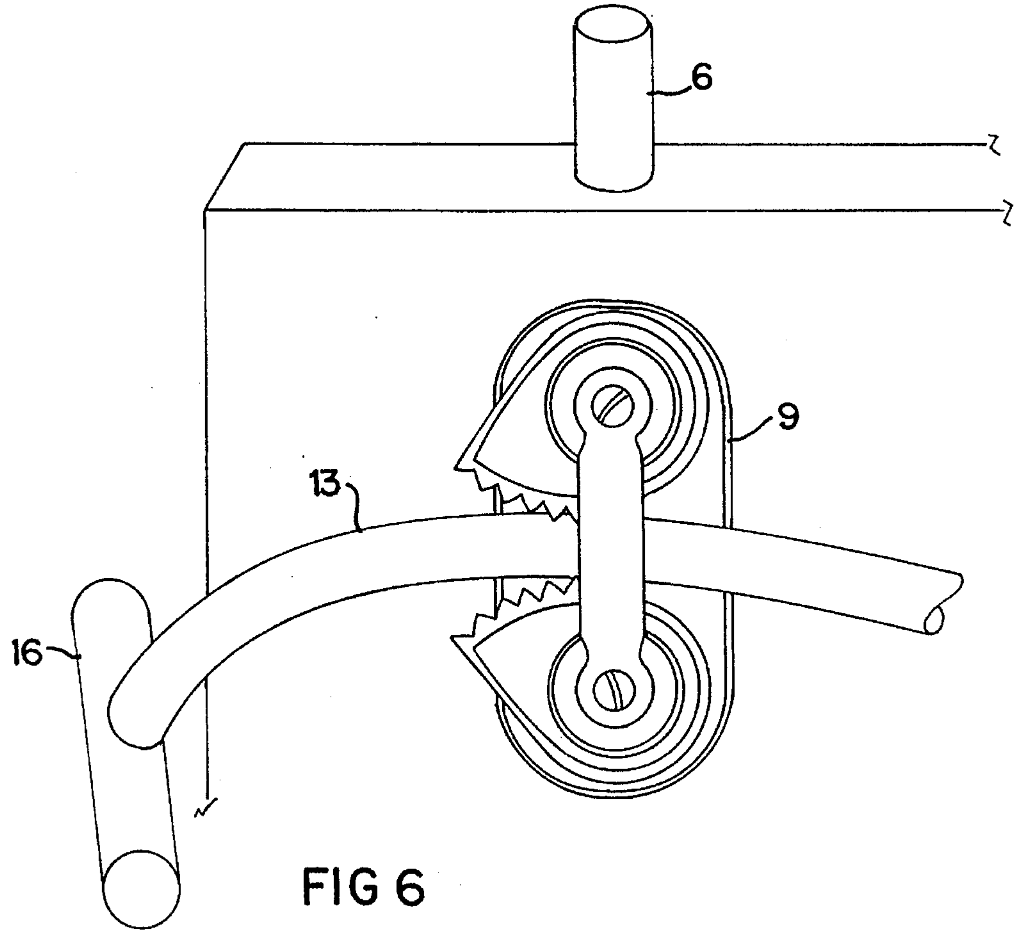
FIG. 6 is a close-up view of the security device used to keep the rope or cable in place when the device of the present invention is not in operation.
Figure 7:
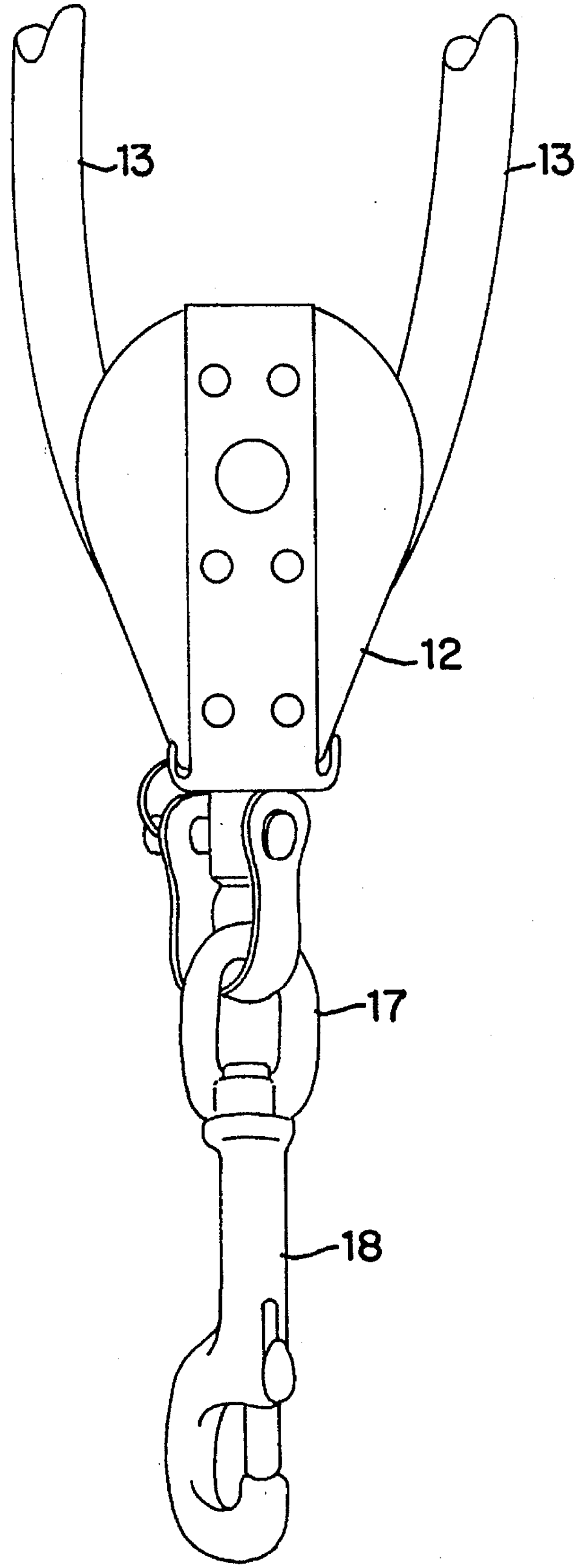
FIG. 7 is a close-up view of the pivotable pulley mechanism linking the rope or cable to the lower frame assembly of the present invention.

The connecting rope or cable 13 is preferably a ⅜" non stretch polyester braided line with a breaking strength of 4900 lbs. Of course, it is to be understood that any of a variety of materials may be used to produce the rope or cable 13. On one end of the rope 13 is a spliced loop 14 which slips over one of the metal pegs 6 on the head board assembly 3. From there it travels through a pulley 15 which is hooked to the draw sheet 1 then through the upright lead block 7 on the center of the head board assembly 3. From there, the line goes through a single bullet block 12 on the frame assembly 10 and back through the wire cheek block 8 which is fastened to the back of the head board assembly 3, as shown in FIG. 5. After the rope 13 passes through that cheek block 8, it passes through a cam-matic jam cleat 9 and terminates in a wooden handle 16, as shown in FIG. 8. The nurse or aid uses this wooden handle 16 to remove the slack in the line prior to operating the bed positioning control. The bullet block 12 shown in FIG. 7 preferably includes a swivel mount 17 that prevents the rope 13 from getting twisted. The swivel mount 17 may be attached to the frame assembly 10 using a standard removable clasp mechanism 18.

Although the preferred embodiment of the present invention has been described herein, it is to be understood that the above description is illustrative. Other means and methods may be substituted for particular features without deviating from the re-positioning device as described. Accordingly, it is to be understood that the present invention is not limited to that which has been precisely shown and described.

I claim:

1. A device for positioning a person in a bed, said device comprising:

a. a draw sheet;

b. a frame assembly affixable to a structural frame of said bed; and c. coupling means passing over a headboard of said bed for joining said draw sheet to said frame assembly.

2. The device as claimed in claim 1 further comprising a headboard assembly affixable to said headboard, wherein said head board assembly includes attachment means for joining said coupling means to said draw sheet and to said frame assembly.

3. The device as claimed in claim 2 wherein said attachment means includes a peg for securing a first end of said coupling means to said head board assembly, pulley means to permit smooth movement of said coupling means over said head board assembly, and locking means for securing a second end of said coupling means.

4. The device as claimed in claim 3 wherein said coupling means is a rope.

5. The device as claimed in claim 3 wherein said coupling means is a cable.

6. The device as claimed in claim 4 wherein said frame assembly includes a pivotable block and pulley means joining said rope to said frame assembly.

7. The device as claimed in claim 6 further comprising a draw sheet pulley joining said draw sheet to said rope.

8. The device as claimed in claim 7 further comprising pivotable loop means for coupling said draw sheet pulley to said draw sheet.

9. The device as claimed in claim 8 wherein said draw sheet is balloon shaped and is fabricated of three layers of material.

10. The device as claimed in claim 9 wherein said draw sheet is positionable between a person and a mattress of said bed.

11. The device as claimed in claim 6 wherein said rope is joined to said headboard assembly, to said draw sheet, and to said frame assembly such that when said bed is moved upward, said rope pulls said draw sheet toward said headboard and when said bed is moved downward, said rope moves to permit said draw sheet to move away from said headboard.

12. The device as claimed in claim 11 wherein said locking means is a jam cleat that can be closed to fix said second end of said rope in a desired position, and that can be opened to release said second end of said rope to permit movement of said rope.

13. The device as claimed in claim 11 wherein said bed is movable with an independent motor.

14. A device for re-positioning a patient in a hospital bed comprising:

a. a balloon-shaped draw sheet including a first layer of bed sheeting, an intermediary layer of an absorbent material, and a slidable layer for contacting a mattress of said bed, said draw sheet further including a first sheet end couplable to a draw-sheet pulley;

b. a frame assembly affixable to a structural frame of said bed, said frame assembly fabricated of steel and formed in a T-shape, said frame assembly including a pivotable frame pulley;

c. a headboard assembly affixable to a headboard of said bed, said headboard assembly including a peg, a first pulley, a second pulley, and a jam cleat; and a rope with a first end formed in the shape of a loop and placeable on said peg, wherein said rope extends from said peg through said draw-sheet pulley over said headboard assembly and said first pulley, said rope further extending downwardly around said pivotable frame pulley and back up to said second pulley, said rope terminating in a second end couplable to said jam cleat of said headboard assembly.

* * * * *